Patented May 21, 1940

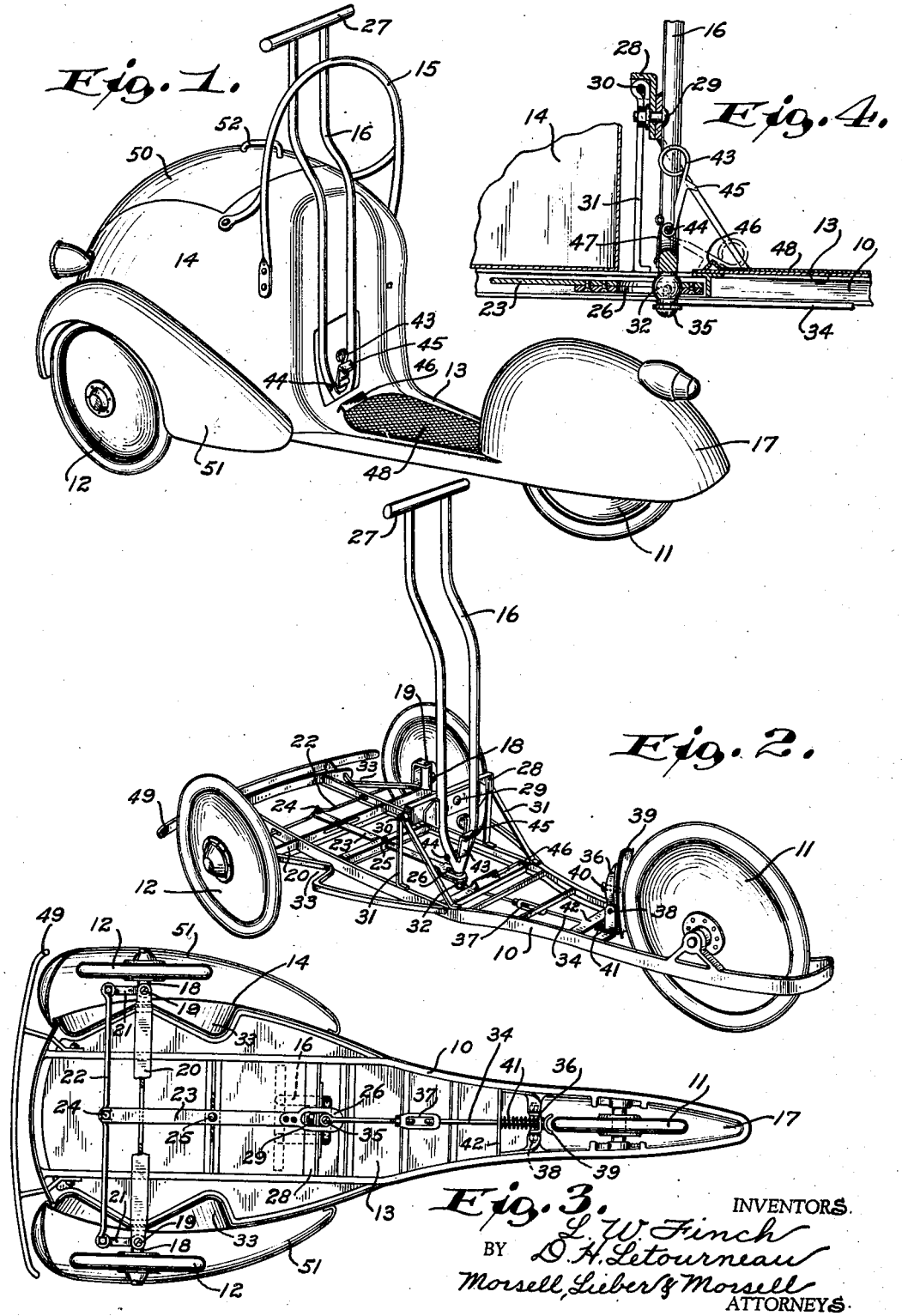

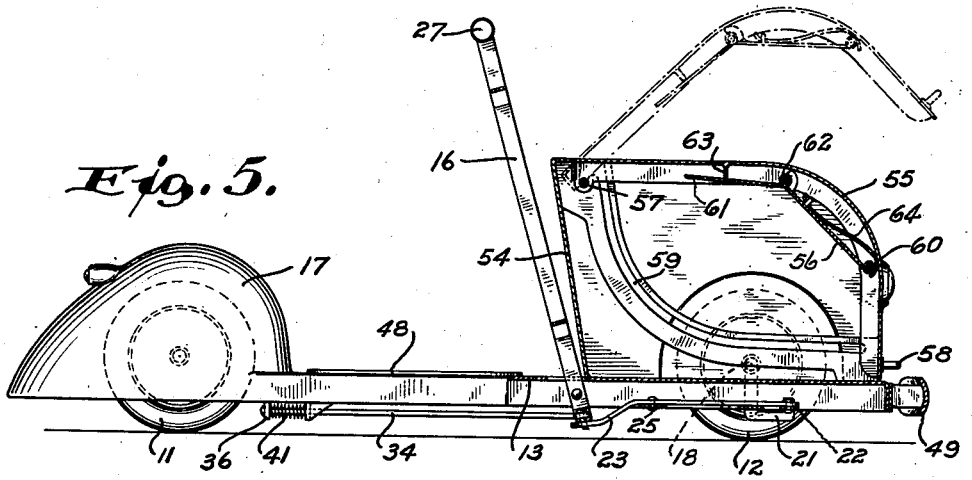
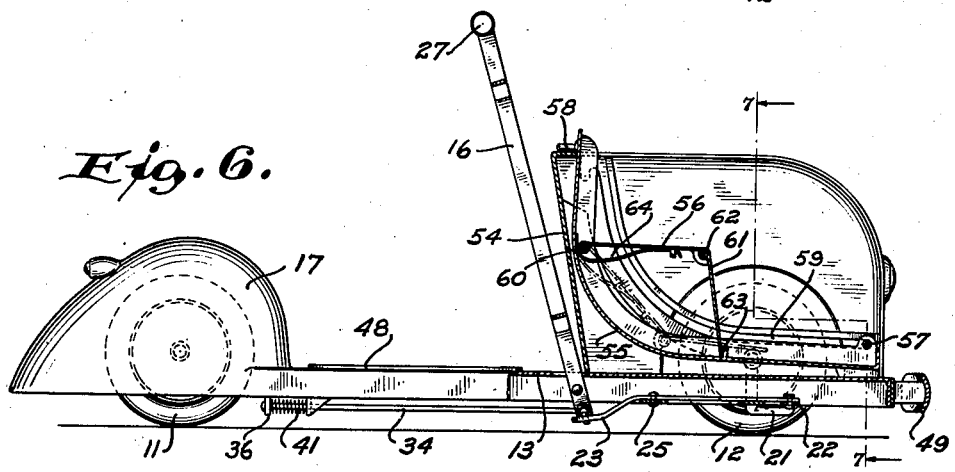
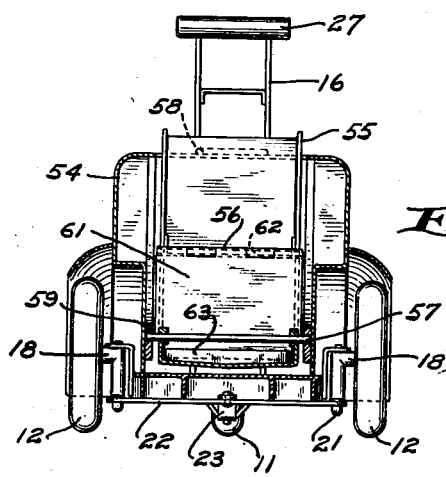

2,201,440

UNITED STATES PATENT OFFICE 2,201,440

VEHICULAR TOY

David H. Letourneau and Laurence W. Finch, Milwaukee, Wis., assignors of one-third to Marie Grotelueschen, Milwaukee, Wis.

Application March 21, 1938, Serial No. 197,174

4 Claims. (Cl. 280—88)

Our present invention relates in general to improvements in the construction and operation of vehicular assemblages such as toys of the coaster of scooter type, and relates more particularly to improvements in control mechanisms and auxiliary load confining structures for toy vehicles or the like.

Generally defined, an object of our invention is the provision of an improved scooter type of vehicle which is conveniently manipulable and controllable, and which also has maximum utility and safety.

It has heretofore been proposed to provide vehicular toys such as coasters and scooters with common control means cooperable with the same supporting wheel, for effecting both steering and braking of the vehicle, in an effort to make such toys more conveniently and safely operable. In these prior common control assemblages, the steering column was rotatable or oscillatable about its own longitudinal axis for steering purposes, and was adapted to be swung bodily in order to set the brake on the steering vehicle wheel. The fact that both steering and braking was effected on the same vehicle wheel, usually a single front wheel, made it quite dangerous for a child to suddenly apply the brake on these prior vehicles, and also necessitated the provision of relatively complicated control mechanism which could not be conveniently and accurately adjusted. The oscillation or rotation of the steering column for steering purposes, in these prior toys, also introduced danger of "shimmying" and loss of control when the vehicle was proceeding at relatively high speed. Then too, it has been found preferable in a three wheeled vehicle of the coaster or scooter type which is propelled by intermittently pushing the same with one foot applied directly to the ground, to provide two front steering wheels in order to increase the stability and to avoid danger of tipping. None of the prior toy vehicles of this type have proven entirely successful and satisfactory primarily because of improper application of the steering and braking forces, and also due to improper load distribution.

It is therefore a more specific object of our present invention to provide an improved vehicular toy wherein the steering and braking forces may be most effectively and conveniently applied with maximum safety, which can be readily manipulated and turned on a short radius, and which is amply protected against possible tipping.

Another specific object of the invention is the provision of improved control mechanism for a three wheeled scooter having two front and one rear supporting wheel, which is manipulable by a single lever adapted to cooperate with the front wheels for steering and with the rear wheel for braking purposes.

A further specific object of our invention is to provide an extremely stable wheeled toy having maximum auxiliary load carrying capacity, and which is especially adapted for use in carrying newspapers, packages or an extra passenger in addition to the operator.

Still another specific object of this invention is the provision of an improved vehicular toy having extremely attractive streamlined appearance, and which may be provided with a simple body closure adapted to be adjusted so as to provide a comfortable passenger seat.

An additional specific object of the present invention is to provide a stable, durable, and conveniently controllable road vehicle having maximum utility, and which may be manufactured and sold at moderate cost.

These and other specific objects and advantages will be apparent from the following detailed description.

A clear conception of embodiments of the several features of our present improvement, and of the mode of constructing and of operating vehicular toys built in accordance with the invention, may be had by referring to the drawings accompanying and forming a part of this specification wherein like reference characters designate the same or similar parts in the various views.

Fig. 1 is a rear and side perspective view of one type of complete vehicular toy embodying our improvements;

Fig. 2 is a similar perspective view of the same toy with the housing and wheel guards removed so as to leave only the chassis, wheels and control mechanism;

Fig. 3 is a bottom view of the wheeled toy of Fig. 1;

Fig. 4 is an enlarged fragmentary longitudinal sectional view through the toy, showing the mechanism at the lower end of the control lever;

Fig. 5 is a part sectional side elevation of another type of toy embodying our invention and having an improved enclosing cover and collapsible seat therein;

Fig. 6 is a similar view of the toy shown in Fig. 5, with the housing enclosure inverted; and Fig. 7 is a transverse vertical section through the vehicle of Fig. 6, the section being taken along the irregular line 7—7 of Fig. 6.

While we have shown and described our invention as being specifically applied to a vehicular scooter toy of the three wheel streamlined type, it is not the intent to thereby unnecessarily restrict the scope, since some of the novel features may obviously be more generally applied to other types of road vehicles.

Referring specifically to Figs. 1 to 4 inclusive of the drawings, the improved scooter or coaster toy shown therein, comprises in general a chassis or frame 10 transportably supported by a single rear wheel 11 and by two laterally spaced front wheels 12; a platform 13 resting upon the main frame 10; an auxiliary load confining housing 14 mounted upon the frame 10 and platform 13 between the front wheels 12 and having a gripping rail 15 rigidly associated with the rear portion thereof; a combined steering and brake lever 16 tiltably suspended from the medial portion of the frame 10 behind the housing 14; and mechanism operatively connecting the lever 16 with the steering and braking devices for the wheels.

The main frame 10 may be rigidly constructed of structural metal bars in any suitable manner, and is preferably suspended from the wheels 11, 12 beneath the axes thereof and as near to the ground line as possible in order to lower the center of gravity to the extreme. The wheels 11, 12 are preferably provided with antifriction bearings and with rubber tires, and the rear wheel 11 is mounted for rotation about a fixed axis and may be covered by means of a rear fender or guard 17 so as to protect both the wheel and the vehicle operator. The front wheels 12 are rotatable upon stub axles 18 which are swingable about vertical pivots 19 secured to the opposite ends of a rigid axle beam 20 securely attached to the chassis. Each of the stub axles 18 has an integral arm 21, and the outer ends of these arms 21 are pivotally attached to the opposite ends of a cross rod 22 the medial portion of which is connected to the front end of a lever 23 by means of a pivot bolt 24. The mid-portion of the lever 23 is swingably connected to the chassis frame 10 by a pivot pin 25, and the rear end thereof is provided with a slotted head 26 which is swingable in a horizontal plane beneath the chassis.

The common control lever 16 has an upper actuating handle 27 and is laterally swingably suspended from the center of a supporting beam 28 by means of a pivot 29, while the beam 28 is provided with a trunnion rod 30 journalled in brackets 31 carried directly by the chassis frame 10. The lever 16 is thus mounted for lateral oscillation about the pivot 29, and for swinging movement in the plane of travel of the vehicle about the trunnion rod 30; and the lower end portion of this control lever 16 is provided with a substantially spherical enlargement 32 which at all times coacts with the slot in the head 26 so that lateral oscillation of the lever 16 will be transmitted through the lever 23, cross-rod 22 and arms 21 to the front wheels 12 and will cause the latter to simultaneously swing about their supporting pivots 19. It is to be noted that the frame 10 and platform 13 are formed with side recesses 33 in the horizontal plane of swing of the wheels 12, so that these wheels may be swung through a considerable arc and thereby effect short turning.

The extreme lower end of the control lever 16 is loosely pivotally attached to the front end of a horizontal brake rod 34 by means of a cap screw 35, and the brake rod 34 is guided for reciprocation in the chassis by a bracket 36 and is adjustable in length by means of a turnbuckle 37. The bracket 36 is swingable about pivot bolts 38 carried by the frame 10; and a brake shoe 39 which is directly cooperable with the rear wheel 11 beneath the guard 17, is loosely pivotally attached to the upper portion of the bracket 36 by a pin 40. A helical compression spring 41 which embraces the rod 34 and which reacts against a cross-brace 42 of the chassis, functions to constantly swing the bracket 36 so as to release the brake shoe 39, and also swings the control lever 16 so as to maintain the enlargement 32 in the rear portion of the slot in the head 26. The lower portion of the control lever 16 beneath the pivot 29 is also provided with a pivoted latch 43 swingably suspended from a pin 44 and having a flange 45 which is adapted to abut against the front face of an abutment 46 as shown in dot-and-dash lines in Fig. 4. When the latch 43 is swung upwardly as shown in solid lines in Fig. 4, the spring 41 is free to hold the brake shoe 39 in inactive position, but when the upper portion of the control lever 16 is swung rearwardly about the rod 30, and the latch is swung into the dot-and-dash line position, the spring 41 is compressed and the brake is applied. The latch 43 may be frictionally retained in various positions of adjustment by means of a leaf spring 47, and is readily operable either by hand or foot.

The chassis platform 13 may be provided with a rubber wear pad 48 between the housing 14 and the rear guard 17, and the gripping rail 15 which is attached to the front housing 14 preferably extends rearwardly of the hand lever 16 but does not interfere with the lever movements. The front of the vehicle may be provided with a bumper guard 49 as shown, and the housing 14 which is disposed between the front wheels 12, is provided with a removable closure cover 50 and has side fender guards 51 extending over the wheels 12 without obstructing the steering movements thereof. The cover 50 is preferably made completely removable, and is adapted to be opened or removed with the aid of a handle 52; and this closure may also be made reversible and disposable within the housing 14 so as to provide a seat for an additional passenger. The vehicle is preferably streamlined so as to provide an attractive and neat appearance, and may also be provided with head and tail lights as shown, adapted to be operated with a battery system.

Referring more particularly to Figs. 5, 6 and 7, the improved vehicle shown therein is quite similar to that just described, except that the housing assemblage located between the front wheels 12 is somewhat modified. In the modification, the front housing 54 is provided with a closure cover 55 which is not only adapted to be opened or removed, but which can also be reversed or inverted, and which has a collapsible seat 56 associated with the interior thereof. The cover 55 is normally swingably suspended from a pivot rod 57 and has a manipulating handle 58. The rod 57 has outwardly projecting ends adapted to slide along guideways 59 secured within the opposite sides of the housing 54 in order to reverse the cover 55, and when thus inverted, the handle 58 coacts with the housing 54 and the rod ends coact with the ends of the guideways 59 to provide stops for the cover, as indicated in Fig. 6. The seat 56 is pivotally suspended from the cover 55 by a hinge 60, and has a front apron 61 swingably attached to its front edge by means of a pivot 62. The free edge of the apron 61 is adapted to engage a transverse flange 63 on the cover 55 in order to maintain the seat in assembled position as shown in solid lines in Figs. 5, 6 and 7, but the seat assemblage may be readily collapsed or flattened as indicated in Fig. 5. A suitable spring 64 coacts with the seat 56 to prevent the same from dropping when the cover 55 is closed as in Fig. 5, and also tends to urge the seat against the interior of the cover when the apron 61 is released from the flange so as to provide maximum storage space.

During normal use of the improved scooter or coaster, the brake latch 43 is released, and the operator may stand with one foot positioned upon the rubber pad 48 and may propel the vehicle by intermittently applying the other foot to the ground and pushing himself as well as the vehicle along a definite course. The operator grips the handle 27 and may swing the front steering wheels 12 in either direction by merely swinging the lever 16 laterally in the same direction of travel, this being the normal and instinctive act. In order to apply the brake it is only necessary for the operator to pull rearwardly on the handle 27 and lever 16, whereupon the brake shoe 39 is brought into engagement with the tire of the rear wheel 11, with more or less pressure depending upon the degree of pull exerted upon the lever 16. The control lever 16 may be manipulated either with one or two hands, and the operator may if desired grip the hand rail 15 in order to secure greater stabilizing effect. If the vehicle is to be abandoned by the operator he may press the latch 45 into a locking engagement with the abutment 46 as indicated in dot-and-dash line in Fig. 4 whereupon the brake will remain set and will thus retain the vehicle in position. It will thus be noted that the improved vehicle may be readily manipulated for steering and braking purposes, and with the assemblage shown it is possible to turn the vehicle on an extremely short radius. By virtue of the fact that the front steering wheels 12 are separated a considerable distance, and also due to the fact that the chassis 10 is disposed beneath the wheel axes, an extremely stable structure is obtained, and this spreading of the front wheels also provides for considerable auxiliary load storage space. The cover 50 may be conveniently opened or removed, and the space within the housing 14 may then be utilized for the storage of newspapers, bundles, or other objects, and may even be utilized for the installation of a small motor for driving the vehicle.

From the foregoing detailed description it will be apparent that our invention provides an extremely compact, durable and stable land vehicle which may be conveniently manipulated with the aid of a single control lever. The vehicle is capable of being turned on an extremely short radius without danger of tipping, and the brake may be conveniently adjusted so as to provide for proper braking effect, by merely turning the turnbuckle 37. The steering function of the lever 16 is in no manner interfered with by the brake mechanism, and vice versa, and the latch 45 provides simple and effective means for permanently setting the brake. With the embodiment of the invention shown in Figs. 5 to 7 inclusive, the cover may be readily inverted to provide seating for an extra passenger, and this assemblage may also be operated with the cover open but not necessarily removed from the vehicle. The fact that the control lever 16 is oscillatable laterally for steering purposes, eliminates danger of tipping or loss of control due to "shimmying", and the braking effect is at all times under control of the operator. The rearward movement of the lever 16 for setting the brake is also advantageous because the operator will naturally tend to draw back when attempting to stop the vehicle, and the housing for auxiliary load may be caused to cooperate with the front and rear fender guards so as to produce an extremely attractive and neat appearance. An important feature of our invention is the provision of steering and brake mechanisms, both of which are operable by the normal and instinctive act of the operator in performing these functions. For example, when the vehicle is to be turned right or left, the steering column is moved either right or left; and when the brake is to be applied, the column is pulled rearwardly, and this may be done regardless of whether steering is being simultaneously effected. The steering column of our present invention is a lever of the first class having the fulcrum intermediate the power and load, and thus permits effective application of the steering and braking forces. The improved housing also provides a closure of relatively weather-proof construction for confining and carrying newspapers and other packages. All of the actuating mechanism is moreover protected against damage and the operator is protected against possible injury due to contact with movement parts, and the assemblage can obviously be manufactured and sold at moderate cost and is safe in every respect.

It should be understood that it is not desired to limit this invention to the exact details of construction or to the precise mode of use, herein shown and described, for various modifications within the scope of the claims may occur to persons skilled in the art.

We claim:

1. A land vehicle comprising, a chassis, front steering wheels rotatably suspended from the opposite sides of the front portion of said chassis, a rear supporting wheel rotatably suspended from the rear portion of said chassis, said chassis having a passenger deck disposed considerably beneath the horizontal plane of the axes of said wheels, steering arms for said front wheels extending forwardly from the axles thereof, a brake disposed forwardly of the axle of said rear wheel, and a common tiltable lever pivotally suspended from said chassis and connected with said steering arms and with said brake for swinging said steering arms and for applying said brake.

2. A land vehicle comprising, a chassis, front steering wheels rotatably suspended from the opposite sides of the front portion of said chassis, a rear supporting wheel rotatably suspended from the rear portion of said chassis, said chassis having a passenger deck disposed considerably beneath the horizontal plane of the axes of said wheels, steering arms for said front wheels extending forwardly from the axles thereof, a brake disposed forwardly of the axle of said rear wheel, a common tiltable lever pivotally suspended from said chassis for swinging said steering arms and for applying said brake, and motion transmitting connections connecting said lever with said arms and with said brake beneath said deck.

3. A land vehicle comprising, a chassis, front steering wheels rotatably and swingably suspended from the opposite sides of the front portion of said chassis, a rear supporting wheel rotatably suspended from the rear portion of said chassis between said front wheels, steering arms for said front wheels extending forwardly from the axle thereof, a horizontal lever pivotally suspended from said chassis and connected with said steering arms for simultaneously swinging said arms and said front wheels for steering purposes, a brake carried by said chassis and cooperating with said rear wheel, and an approximately upright lever connected with said horizontal lever and with said brake and being tiltably suspended from said chassis to coact with said horizontal lever to swing the same about its suspension pivot and with said brake to set the same.

4. A land vehicle comprising, a chassis, front steering wheels rotatably and swingably suspended from the opposite sides of the front portion of said chassis, a rear supporting wheel rotatably suspended from the rear portion of said chassis between said front wheels, steering arms for said front wheels extending forwardly from the axles thereof, a horizontal lever pivotally suspended from said chassis and connected with said arms for simultaneously swinging said arms and said front wheels for steering purposes, a brake carried by said chassis and cooperating with said rear wheel, an adjustable connection extending forwardly from said brake toward the rear end of said horizontal lever, and an approximately upright lever tiltably suspended from said chassis and coacting with said horizontal lever to swing the same about its suspension pivot and with said connection to set and release said brake.

DAVID H. LETOURNEAU.
LAURENCE W. FINCH.